G. SCHOETTINGER.
SCALE PLATFORM.
APPLICATION FILED FEB. 14, 1911.
1,012,105.
Patented Dec. 19, 1911.
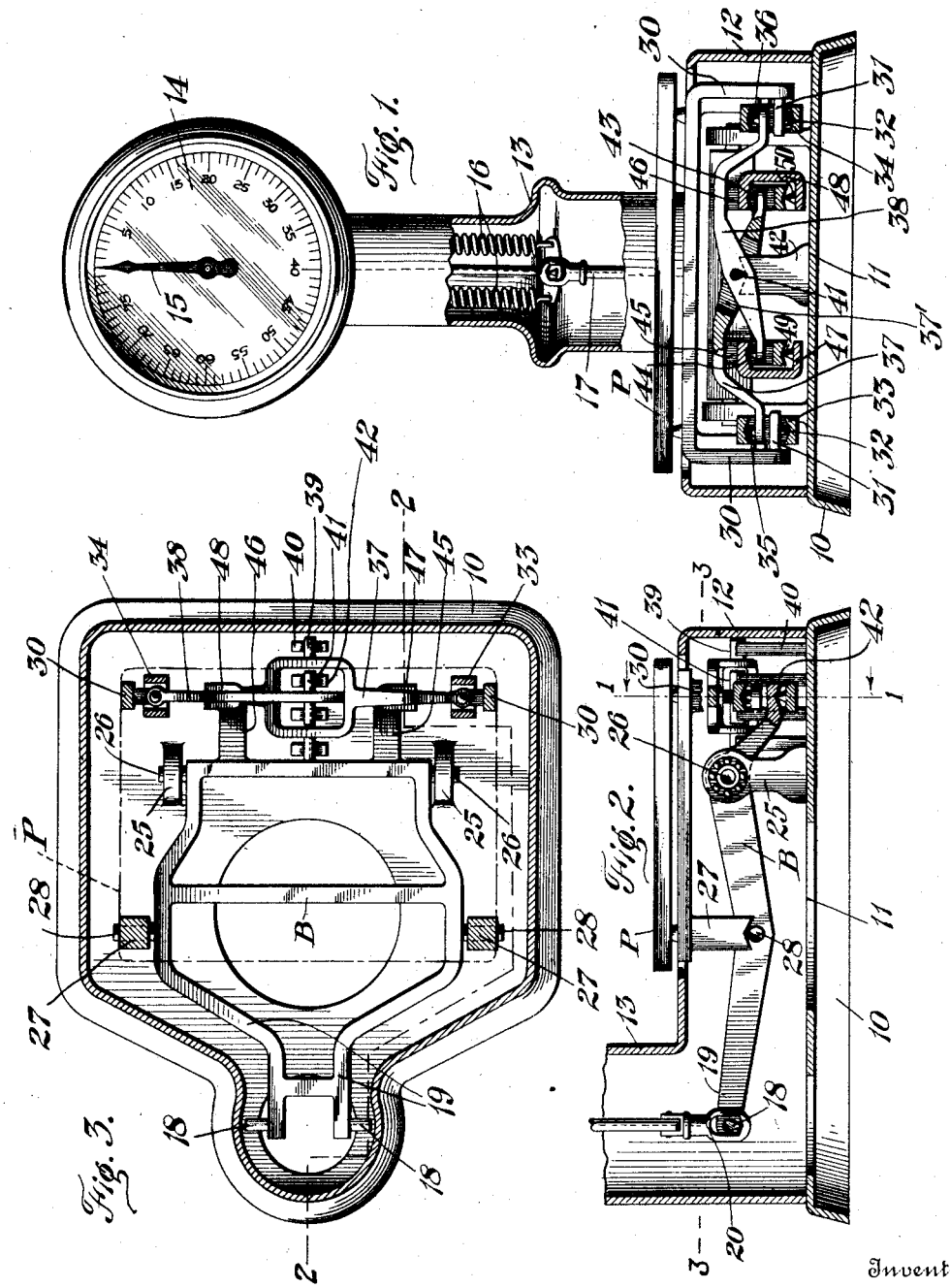
Witnesses
Chas. W. Stauffiger.
F. E. Ernst
Inventor
GEORGE SCHOETTINGER
By Barthel & ... 
Attorneys

UNITED STATES PATENT OFFICE.

GEORGE SCHOETTINGER, OF DETROIT, MICHIGAN.

SCALE-PLATFORM.

1,012,105.  Specification of Letters Patent.  Patented Dec. 19, 1911.

Application filed February 14, 1911. Serial No. 608,583.

*To all whom it may concern:*

Be it known that I, GEORGE SCHOETTINGER, a citizen of the United States of America, residing at Detroit, in the county of Wayne and State of Michigan, have invented certain new and useful Improvements in Scale-Platforms, of which the following is a specification, reference being had therein to the accompanying drawings.

This invention relates to weighing-scales, and more especially to that class thereof which are generally known as "platform" scales, and it has for one of its objects an improved system of supporting the platform and its connection with the beam.

Further objects of the invention will hereinafter appear and be defined in the claims.

The invention has been clearly illustrated in the accompanying drawings, in which similar characters denote similar parts, and in which—

Figure 1 is a face view of a scale embodying my invention, the platform-inclosing casing being shown in section on line 1, 1 of Fig. 2; Fig. 2 is a vertical section on line 2, 2 of Fig. 1, and Fig. 3 is a horizontal section on line 3, 3 of Fig. 2.

Briefly stated, the platform is supported on its four corners, and the beam is fulcrumed directly below and within the confines of these supports. Two adjacent corners are supported directly on the beam itself; while the other two corners are supported respectively by a pair of independent crossed levers which are linked to the beam, so organized that all four corners of the platform rise and fall simultaneously and for the same amount, and thus preserve the level condition thereof.

Referring to the drawings, a base 10, has a top-plate 11 on which the several supporting parts of the scale are mounted. A casing 12 may be pivoted to inclose the beam-mechanism, and it has at one end thereof a tubular column 13 which may have any suitable indicating-device at its top, as for instance a dial 14 over which a pointer 15 travels to show the weight by the descent of the platform against the resistance of springs or weights whichever the case may be. In the present instance I have illustrated, as a sample of such resistance means, springs 16 attached to a tension rod 17 which is connected directly with the beam B of the scale, by knife-edges 18 fixed on the skeleton arm 19 of the beam and seated in the branches of a bifurcated strap-end 20 carried by the lower end of the tension rod 17. All these parts may be of any desired construction and organization, or any other devices may be substituted therefor.

Secured upon the base plate 11 are a pair of pivot-posts 25 in which the beam B is pivoted by its trunnions 26 which are supported in ball-bearings spaced some distance apart (see Fig. 3) to form a broad pivot-base for the beam. As above stated, the platform is supported at its four corners, the platform P being provided at its underside with a pair of alined lugs 27 resting on knife-edges 28 secured to the beam-arm 19, so that a direct beam-support for the platform is established at those two points. The platform extends across the beam-pivot posts 25 and is supported at the two remaining corners in an indirect manner by the beam B, a pair of lugs 30 (see Fig. 1) depending from the platform and having ears 31 which carry cone-points 32 seated in strap-links 33, 34 respectively. These links, are in turn, suspended on cone-points 35, 36 secured respectively in the outer or load-carrying ends of a pair of independent balance-levers 37, 38 which are disposed in the same vertical plane but cross each other in the manner shown in Figs. 1 and 3, viz: the lever 37 has an opening 37' through which the plain other lever 38 passes and which permits both levers to play freely and independently of each other on their respective pivot-supports, the lever 38 having a pair of knife-edges 39 supported on posts 40 which are secured on the base plate; while the straddling lever 37 has knife-edges 41 which rest on posts 42 also secured on said base plate 11. The other or "check" ends of the levers 37 and 38 have, respectfully, cone-points 43, 44 which are connected with the beam B, the latter having a pair of arms 45, 46 extending forward of the pivot or fulcrum posts 25, while the arms 19 extend rearwardly therefrom. Connection between the arms 45, 46, and the levers 37, 38 is established by means of links 47, 48 which are provided with cone-points 49, 50, respectively in engagement with the arms 45, 46.

It may be stated at this time, that the arms 45, 46 of the beam do not in reality serve as direct "supports" for the platform, but simply as "follow-up" devices to regulate the rocking movement of the balance-levers 37 and 38, as the platform descends, in accordance with the descending movement of the arm 19 of the beam. In order to explain this point fully, the question of leverage has to be considered, also, the ratio of the platform-connections on the beam B (edge 26 to edge 28)÷(edge 26 to point 50) being 2÷1. In a like manner the leverage of the balance lever 37 (edge 41 to point 35)÷(edge 41 to point 43) is also 2÷1. And, furthermore the leverage of the balance lever 38 (edge 39 to point 36)÷edge 39 to point 44) also equal 2÷1. Bearing these proportions in mind, it will now be understood that, when it is supposed the platform is loaded and that the platform-supporting edge 28 on the beam B descends one inch, the forward end of the platform naturally tends to descend also. But the distance which this end of the platform can descend is entirely and completely controlled by the forward arms 45, 46 of the beam, the ends of these arms rising one-half inch, thus allowing the short arms of the balance levers 37 and 38 to swing upward for one-half inch also. This means that the long arms of these levers may descend one inch; and, inasmuch as the platform is directly connected with these long arms (through the suspension-links 33, 34), it follows that the front end of the platform will descend one inch, just the same as the rear end, and a perfect equilibrium of the platform will be maintained.

The proportions above stated, are of course, subject to change collectively, the 2÷1 relation being merely preferred in the present organization. Likewise many other changes may be made in the construction and general assemblage of the several elements without departing from the spirit of the invention.

I claim:

1. The combination with a base, and a beam pivotally supported thereon and having a load carrying arm, of a platform supported at one end directly on said arm, a pair of check arms extending from the beam oppositely to the load-carrying arm, a pair of balance levers connecting the front end of the platform with said check-arms, respectively, and means for pivotally supporting said balance levers at a point intermediate their ends.

2. The combination with a base, and a beam pivotally supported thereon and having a load carrying arm, of a platform supported at one end directly on said arm, a pair of check arms extending from the beam oppositely to the load-carrying arm, a pair of balance levers connecting the front end of the platform with said check-arms, respectively, and alined posts on the base for supporting said balance levers at a point intermediate their ends.

In testimony whereof I affix my signature in presence of two witnesses.

GEORGE SCHOETTINGER.

Witnesses:
  GEO. PERKINS,
  ANNA C. RAVILER.

Copies of this patent may be obtained for five cents each, by addressing the "Commissioner of Patents, Washington, D. C."